3,585,084
PROCESS FOR COATING METALS
Lester Steinbrecher, Southampton, and Wilbur S. Hall, Plymouth Meeting, Pa., assignors to Amchem Products, Inc., Ambler, Pa.
No Drawing. Continuation-in-part of application Ser. No. 554,336, June 1, 1966. This application Jan. 16, 1969, Ser. No. 791,801
Int. Cl. C23f 7/00; B44l 1/098
U.S. Cl. 148—6.2    39 Claims

ABSTRACT OF THE DISCLOSURE

Method for applying a coating to a metallic surface, the surface being immersed in an acidic aqueous coating composition comprising an organic coating-forming material, an oxidizing agent, hydrogen ion and an anion, wherein the weight of the coating formed on the surface can be controlled by the time the surface is immersed in the composition.

---

This is a continuation-in-part of application Ser. No. 554,336, filed June 1, 1966, now abandoned.

This invention relates to the application of coatings on metallic surfaces.

Hereinafter in this specification, as well as in the claims appended hereto, the arm "ferriferous" means iron, steel, and alloys of iron; the term "steel" is meant to denote alloys of iron wherein iron is the principal ingredient, such as cold- and hot-rolled steel in which the alloying constituents comprise minor amounts of carbon, silicon, and manganese. When utilized herein the term "zinciferous" means zinc and zinc alloys in which zinc is the principal constituent, as well as galvanized surfaces, including both hot-dipped and electrogalvanized surfaces.

It is known that when an article of steel is immersed in an aqueous dispersion of a film-forming polymer, the thickness of the resulting coating depends on such factors as total solids, specific gravity and viscosity. Time of immersion is not a determinative factor. For a given aqueous dispersion, the thickness obtained after ten minutes immersion is not appreciably different from the thickness obtained after five seconds immersion. Further, when the article is withdrawn from the aqueous polymeric dispersion, it cannot be rinsed without removing virtually all of the polymer from the surface, thus demonstrating a lack of adherence to the substrate. Another shortcoming of this method of applying a coating is that when the article is withdrawn from the coating bath, little or no coating is formed on the edges of the article.

It is an object of this invention to provide a method for producing coatings on metallic surfaces by immersing said surface in a coating composition which forms a coating on the surface, the weight of the coating being a function of the time the surface is immersed in the composition.

It is another object of this invention provide an improved process and composition for forming an metallic surface an organic resinous or non-resinous coating wherein the coating is applied by immersing the surface in a coating composition.

It is another object of this invention to produce organic coatings on metallic surfaces, including particularly ferriferous and zinciferous surfaces, of controllable thickness or coating weight, the coating weight being a function of coating time.

It is another object of the present invention to provide a method and composition for applying coatings to metallic surfaces from aqueous polymeric dispersions or solutions which coatings can be made appreciably thicker than those obtainable heretofore by single stage operations.

A related object of the invention is the provision of a method and composition for applying polymeric coatings to metallic surfaces which render it unnecessary to resort to multiple stage coating operations to attain a coating of the desired weight and properties.

It is an additional object of the present invention to form coatings on metallic surfaces from aqueous polymeric dispersion or solutions, which coatings display appreciably improved corrosion resistance and adhesion properties.

Still another object of this invention is the production of coatings from aqueous polymeric dispersions or solutions on metallic surfaces which coatings are initially adherent, and thus capable of being rinsed before baking or drying without removing more than a superficial layer of the coating, to thereby provide increased flexibility in processing and handling.

Another object of this invention is to provide a resinous coating composition and method for applying a coating to the edges of a metallic surface.

Still another object of this invention is to provide metallic surfaces with coatings which are continuous and free of pinholes and holidays when the coating is applied by immersing the surface in an aqueous coating composition.

In accordance with this invention, it has been found that objects set forth above can be realized by immersing or dipping a metallic surface in an acidic aqueous composition comprising water, an organic coating-forming material, an oxidizing agent, hydrogen ion and an anion. Organic coating-forming materials which can be utilized in this invention are resinous materials such as for example, polyethylene, polyacrylics, and styrene butadiene and non-resinous organic materials such as, for example, fatty acids. The organic coating-forming ingredient can be present in the acidic aqueous composition either in dissolved form, in emulsified form, or in dispersed form.

A preferred composition of this invention is an acidic aqueous composition comprising water, hydrogen ion, fluoride ion, an oxidizing agent selected from the class consisting of hydrogen peroxide and dichromate and particles of resin dispersed in the composition, wherein the hydrogen and fluoride ions are added to the composition in the form of hydrofluoric acid, and wherein the pH of the composition is within the range of about 1.6 to about 3.8.

Also in accordance with this invention, there is provided a process for applying an organic coating-forming material to a metallic surface from an acidic aqueous carrier of said material, the process comprising: immersing the surface in the carrier; generating a precipitating agent in said carrier in the region of said surface, said agent comprising at least in part metallic ions, preferably an ionized form of the metal comprising the surface, and derived in part by the chemical attack of said carrier on said surface; depositing the coating-forming material from said carrier onto the surface by the action of said precipitating agent to form a coating on the surface; maintaining the surface in the carrier a period of time during at least a portion of which the coating increases in thickness; and withdrawing the coated surface from the carrier.

In accordance with one aspect of this invention, it has been found that organic resinous and non-resinous coatings can be applied to a metallic surface by the method comprising: dissolving ions from the metallic surface by immersing it in an acidic aqueous composition comprising an organic coating-forming material; precipitating the coating-forming material with ions of the metallic surface in the region of the metallic surface and the ions; maintaining the metallic surface in the composition as the organic coating-forming material deposits on the surface to form a coating thereon; and withdrawing the coated surface from the composition after sufficient time has elapsed to allow the coating to build-up in thickness. By way of example, when a ferriferous surface is immersed in an acidic aqueous coating composition of this invention, iron is dissolved from the surface by hydrogen ions to provide ferrous ions in solution. The oxidizing agent functions to oxidize the ferrous ions to ferric ions. In the case where a charged organic coating material is present, the ferric ions function to discharge the charged organic coating-forming material, for example negatively charged dispersed resin particles. The particles precipitate and coagulate on the surface where they form a continuous film of thickness which is continuously increased with time. Upon withdrawal of the metallic surface from the composition, the surface has formed thereon a coating which is initially adherent to the metallic substrate. Thus, the coating resists being washed off the surface when the surface is rinsed. With respect to the charged organic coating-forming material that is used in the composition, it is noted that if the material is dissolved in the composition, it, of course, will inherently carry a charge. Water soluble resins, for example polyelectrolytes such as polyacrylic acid, are examples of such materials. Emulsified or dispersed particles can inherently carry a charge, for example anionic and cationic materials. On the other hand, organic materials which inherently do not carry a charge and which are not ionizable, for example nonionic materials, may nevertheless be charged due to the presence of ionizable materials in the composition such as for example, surfactants, which may be adsorbed on the surface of the particle. Thus, when the term "charged organic coating-forming material" is used herein, it means a material which inherently carries a charge due to the presence of ionizable materials which are adsorbed on the surface of the particle or otherwise associated therewith. Nonionic colloidal materials, for example nonionic surfactants such as ethoxylated alkylphenols, have been deposited also by the process of this invention.

The present invention, described in detail below, provides a coating process which has a number of extremely important characteristics which are not possessed by heretofore known processes. As mentioned hereinabove, heretofore known latex resin compositions can be utilized to form resinous coating on metallic surfaces by immersing the surface in a bath of the composition, but the thickness of the resultant coating is substantially the same regardless of how long the surface is immersed. In essence, the weight or thickness of a coating that can be obtained from a particular latex resin formulation is limited when the surface is simply immersed therein. In order to build up the thickness of the coating, applicators have subjected metallic surfaces to a multiple stage coating operation in an effort to attain a coating of the desired thickness. Such operation includes immersing the metallic surface in a latex resin bath, withdrawing the surface, drying or fusing (as by heating) the coating formed thereon and then repeating the immersion and drying steps until the thickness of the coating is satisfactory. This, of course, is a time-consuming and costly operation. Moreover, some film-forming latex resins do not readily adhere to themselves and efforts to build up layer upon layer of the resin have been frustrated or special techniques must be utilized. This further adds to the cost of the multiple stage application process.

The present invention provides the means by which the thickness or weight of a resinous coating formed on a metallic surface from an immersion bath can be controlled by varying the time the surface is immersed in the bath. By way of example, it is noted that in one particular application of the process and composition of this invention, a steel panel which was immersed for 2 minutes in a coating bath had formed thereon a coating weighing in the range of 450 mgs./sq. ft., and that a second steel panel immersed in the same bath for 10 minutes had formed thereon a coating weighing in the rang of 1,550 mgs./sq. ft.

It is noted that there has been developed an immersion application method by which the weight or thickness of a coating formed on a metallic surface from an aqueous polymeric dispersion can be controlled through the use of electricity. This method is generally referred to as the electrocoat or electrodeposit process for painting metals. The process includes the steps of immersing a metallic surface in an aqueous dispersion of resin (a latex) or an aqueous solution of resin and maintaining the surface therein as an electric current is passed between the surface to be coated and a secondary electrode. By way of example, the surface to be coated or painted is connected to a high-voltage direct-current source and given a positive or negative charge and the tank holding the resin composition is given a charge opposite that of the surface to be coated. As current is passed through the system, the resin component of the aqueous composition deposits on the metal surface and forms a coating thereon. Benefits which are achieved by utilizing the electrocoat or electrodeposit method, which benefits can also be achieved by use of the present invention, are film or coating thickness or weight can be controlled, sharp edges can be coated and a uniform and continuous coating, that is one which does not contain runs or sags, holidays or pinholes, can be obtained. In other words, the present invention can be utilized to achieve benefits provided by the electrodeposit painting process, but with the important advantage that the use of electricity and equipment and control instruments required to operate the electrocoat process is avoided.

A method of applying a coating to a metallic surface according to this invention is distinguishable from the heretofore mentioned electrocoating method in that the use of electricity is obviated. Thus the coating can form on the metallic surface unaided by the application of an external electricapl potential to the surface. To state it another way the process of this invention can be carried out in a substantially electrostatic field-free environment. It should be understood that the surface may have some charge or electric potential as a result of being immersed in the coating composition. Thus, when the terms "external electrical potential" or "substantially electrostatic field-free environment" are used herein, it means that the metallic surface has no charge due to the application of an electric potential from a source other than the composition in which it is immersed.

The invention described herein can be utilized to coat a variety of metallic surfaces. Particularly good results have been obtained in the coating of ferriferous and zinciferous surfaces.

Metallic surfaces which have thereon a previously formed coating also can be coated by the invention. Such previously formed coatings may be of the crystalline or amorphous types. Process and composition for applying such coatings are well known. By way of example, such coatings can include those that are generally referred to as phosphates, chromates, oxalates, and oxides (anodized or chemically converted) coatings.

Continuing with the detailed description of the invention, the organic coating-forming material, as mentioned above, may be present in the acidic aqueous composition either in dissolved form, emulsion form, or in the form of insoluble particles dispersed in the composition. The coating-forming material may be either a resinous compound or a non-resinous compound. Examples of non-resinous coating materials that can be utilized are fatty acids, such as for example stearic acid. Examples of water soluble resinous materials are polyacrylic acid and ethylene maleic anhydride (Monsanto DX–840–12). Aqueous solutions of polyacrylic acids are available commercially, for example those sold under the name Acrysol A–1 and Acrysol A–3. It is preferred to utilize an aqueous composition which has particles of resin dispersed in it.

In formulating a coating composition that has particles of resin dispersed in it, it is preferred that the other ingredients of the composition be added to a latex, that is a dispersion of insoluble resin particles in water. Latices, which are the source of the dispersed resin particles, are readily available and those sold commercially can of course be utilized. Examples of commercially available latices are Pliolite 491, a styrene-butadiene latex; Catalin 1464, an acrylic copolymer latex; and Poly-Em 40, polyethylene latex. In addition to having dispersed therein resin solids, latices usually contain other ingredients including, for example, emulsifiers and protective colloids. The other ingredients used in the composition of this invention are preferably added to the latices in solution form. Upon addition of the other ingredients to a latex, there is obtained a composition which can be characterized as an acidic aqueous solution of an oxidizing agent having dispersed therein solid resin particles.

The amount of organic coating-forming material utilized in the acidic aqueous composition can vary over a wide range. The lower concentration limit is dictated by the amount of coating material needed to provide sufficient material to form a coating. The upper limit is dictated by the amount of material which can be dissolved, emulsified, or dispersed in the acidic aqueous composition.

The coating composition of this invention is acidic and thus contains acid. Any acid, present in an amount sufficient to impart a pH of less than 7 to the composition, can be used. For example, the acid can be a mineral or an organic acid. Typical examples of mineral acids that can be used are sulphuric, hydrochloric, hydrofluoric, nitric, phosphoric, hydrobromic and hydroiodic. Examples of organic acids that can be used are acetic, chloracetic, trichloracetic, lactic, tartaric and polyacrylic acid. Examples of other acids that can be used are fluoboric, fluotitanic and fluosilicic. Hydrofluoric acid is a preferred acid.

With respect to the use of an acid such as for example polyacrylic acid, a resinous material of this nature which is soluble in the composition can be the source of not only the coating-forming ingredient, but also the source of the necessary hydrogen ions. By way of example, it is noted that polyacrylic resinous coatings had been applied to steel panels from an aqueous solution of polyacrylic acid and hydrogen peroxide.

It is noted also that an acid which contains an anion that functions as an oxidizing agent can be the source of not only hydrogen ion, but also the oxidizing agent. An example of such an acid is nitric acid.

As previously mentioned, it is preferred that the aqueous composition have a pH within the range of about 1.6 to about 3.8. Thus, the preferred amounts of acids are those which impart to the composition a pH within the preferred range.

The acid component dissociates, of course, to yield hydrogen ion and an anion. If it is desired to have a particular anion present in a composition such as, for example, fluoride ion, which gives particularly good results, and it is desired also to use an acid other than one which contains the particular anion, then the anion can be added by way of a soluble salt containing the anion.

Any oxidizing agent can be utilized in the practice of this invention. Examples of oxidizing agents that can be used are hydrogen peroxide, dichromate, perborate, bromate, permanganate, nitrite, nitrate, and chlorate. Oxidizing agents can be conveniently added to the composition in the form of its water soluble salt, such as for example alkali and ammonium salts. Particularly good results have been obtained when the oxidizing agent is one which releases oxygen in the acidic aqueous coating composition. The preferred oxidizing agents are hydrogen peroxide and dichromate, with hydrogen peroxide being most preferred. Hydrogen peroxide can be added conveniently to the composition in the form of a 30% aqueous solution. As to the source of dichromate, excellent results have been obtained by utilizing a dichromate salt, for example, calcium dichromate. However, any water soluble hexavalent chromium-containing compound, which forms dichromate in an aqueous acidic medium can be used. For example, chromates and chromic acid can be used as the source of dichromate.

The amount of oxidizing agent that should be used is an amount sufficient to provide an oxidizing equivalent of at least 0.01 per liter of the composition. (The term "oxidizing equivalent" when used herein means the number of grams of oxidizing agent used divided by the equivalent weight of the oxidizing agent. The equivalent weight of the oxidizing agent is the gram molecular weight of the agent divided by the change in valence of all atoms in the molecule which change valence (usually one element).) Amounts of oxidizing agents which provide an oxidizing equivalent somewhat below 0.01 can be used but preferably the oxidizing equivalent should be at least within the range of about 0.01. It appears that there is no critical upper limit as to the oxidizing equivalents that are used; however, it is preferred that the oxidizing agent be present in an amount such that the upper oxidizing equivalent value is about 0.2. However, it should be understood that the oxidizing agent can be used in an amount to provide an oxidizing equivalent much higher than 0.2, for example, one or more.

As previously mentioned in connection with the method aspects of this invention, metal ions tend to be produced from the metallic surface being coated. In order to inhibit or deter the presence of excessive amounts of these ions in the composition, a chelating agent can be used.

There appears hereinafter a description of a preferred composition within the scope of this invention. The preferred composition is one which contains a dispersed resin as the coating-forming ingredient, the source of the resin being a latex thereof, in combination with fluoride ion and either hydrogen peroxide or dichromate as the oxidizing agent. More particularly the preferred aqueous acidic coating composition comprises:

(a) about 5 gs./l. to about 550 gs./l. of resin solids dispersed in the composition, the source of the resin being a latex thereof;
(b) about 0.4 g./l. to about 5 gs./l. of fluoride ion;
(c) an oxidizing agent selected from the class consisting of $H_2O_2$ and dichromate, said agent being present in an amount sufficient to provide from about 0.01 to about 0.2 of oxidizing equivalent per liter of composition; and
(d) hydrogen ion in an amount sufficient to impart a pH to the composition of about 1.6 to about 3.8.

As will be apparent from the discussion which follows, coating compositions within the scope of this invention can be formulated with above mentioned ingredients present in amounts outside of the ranges set forth above—the above described composition being a preferred one.

With respect to the resin component of the above described preferred composition, it is present in the composition in the form of dispersed particles. This aqueous resin dispersion is preferably supplied as a latex.[1] The latex should be stable, of course, in the presence of the other ingredients comprising the composition. The manifestation of an unstable latex or one which cannot be stabilized is the dispersed resin which will precipitate, flocculate or gel.

Examples of commercially available latices which can be used include the following:

| Trade name: | Reported composition |
|---|---|
| Pliolite 491 | Styrene-butadiene. |
| Acrylene 45 | Acrylic co-polymer. |
| Catalin A-1464 | Acrylic co-polymer. |
| Catalin A-1482 | Acrylic co-polymer. |
| Geon 552 | Polyvinyl chloride. |
| Hycar 2600X 91 | Acrylic co-polymer. |
| Hycar 2600X 92 | Acrylic co-polymer. |
| Catalin A-1422 | Acrylic co-polymer. |
| Rhoplex HA-12 | Acrylic co-polymer. |
| Poly-Em 40 | Polyethylene. |
| Pliovic 400 | Acrylic co-polymer. |
| Teflon | Tetrafluoroethylene. |

In accordance with the invention, coating-forming latices other than those listed above, may be employed in the method and compositions of the invention. However, the group of latices listed above has been found to give very satisfactory and acceptable results, and for this reason may be regarded as the preferred set of latex resin materials for use in the invention.

The amount of dispersed resin utilized in the coating composition can vary over a wide range. The lower concentration limit of the resin is dictated by the amount of resin needed to provide sufficient resinous material to form a coating. The upper limit is dictated by the amount of resin which can be dispersed in the acidic aqueous solution. Although higher or lower amounts can be used, it is preferred that the composition contain from about 5 to 550 gs./l. of resin. The volume of latex utilized to provide the desired amount of resin will vary depending on the amount of resin solids dispersed in the latex, as latices varying in solids content are of course available.

The concentration of the resin in the composition has an influence on the weight of coating that will be obtained, other factors held constant. Compositions with greater amounts of a particular resin will produce higher coating weights. For example in one series of experiments panels were immersed for one minute in a composition that contained 1.5 gs./l. of hydrogen peroxide, 2 gs./l. of fluoride ion (added as HF) and different amounts of acrylic resin, the source of which was Catalin A-1316, latex. When the the acrylic resin content was about 12 gs./l. a coating weight of 232.2 mgs./sq. ft. was obtained, whereas when the composition contained in the range of about 250 gs./l. of acrylic resin, the weight of the coating was almost 1550 mgs./sq. ft.

As mentioned above, the preferred aqueous acidic coating composition of this invention contains fluoride ion. The optimum, preferred method of making the composition acidic and adding fluoride ion comprises the use of hydrofluoric acid. This acid permits a simple means for control over pH requirements of the composition and obviates the need for introducing the fluoride ion in the form of an alkali metal, ammonium or other salt. While coatings can be obtained by adding the fluoride in salt form, it is preferred to utilize hydrofluoric acid and avoid the use of salts which may give rise to undesirable cations in the coating composition or complicate pH adjustment. If the fluoride component is added in the form of a salt, the pH of the composition can be adjusted by the use of acids other than hydrofluoric or in combination with hydrofluoric. Examples of such acids include sulfuric, phosphoric, nitric and hydrochloric.

With respect to the fluoride ion concentration, amounts within the range of about 0.4 to about 5 gs./l. of comfposition (calculated as F) are preferred. Nevertheless, higher or lower amounts can be utilized to provide coatings wherein the coating weight builds up as a function of time.

As noted hereinabove, the preferred pH value of the acidic coating composition is within the range of about 1.6 to about 3.8. This pH may be measured by any conventional means, the standard glass electrode method being conventional practice. However, due to the presence of fluoride ion in the coating solution, the pH value should be determined by rapidly observing the value obtained on initial immersion of the glass electrodes. Where the pH is permitted to fall below about 1.6, the coating composition may tend to etch the metal surface. On the other hand, when the pH of the coating composition rises above about 3.8, the composition tends to impart very thin coatings to the metal substrate.

The oxidizing agent used in the preferred coating composition is hydrogen peroxide or dichromate ion ($Cr_2O_7$). Hydrogen peroxide is most preferred. The hydrogen peroxide can be added conveniently in the form of a 30% aqueous solution of hydrogen peroxide.

The dichromate constituent can be added in the form of a variety of water soluble hexavalent chromium-containing compounds. Examples of such compounds include chromic acid, potassium dichromate, magnesium dichromate, potassium chromate and sodium chromate. Any water soluble hexavalent chromium-containing compound, which in an aqueous acidic medium forms dichromate can be used. Preferred sources of the dichromate ingredient are dichromates, for example calcium dichromate. Particularly good results have been obtained by utilizing an aqueous solution of chromic acid and a calcium salt, for example calcium carbonate. In addition, particularly good results have been obtained by adding to the composition an aqueous solution made up from potassium dichromate and calcium acetate. It is preferred also that the source of dichromate be added to the latex used in the form of an aqueous solution of the hexavalent chromium-containing compound.

The preferred amount of oxidizing agent is an amount sufficient to provide an oxidizing equivalent of about 0.01 to about 0.2 in one liter of the composition. Somewhat lesser amounts of the oxidizing agent which provide an oxidizing equivalent outside of the lower value can be utilized also. The upper equivalent value is not critical and can be much higher. For example, resinous coatings have been obtained when the amount of hydrogen peroxide used provided an oxidizing equivalent in excess of one. It has been observed that when dichromate is utilized as the oxidizing agent in amounts to provide oxidizing equivalents in the higher range, then higher amounts of fluoride should be used—for example 3½ to 5 gs., when the dichromate equivalnt is within the range of about 0.1 to about 0.2.

As to particularly preferred amounts of the oxidizing agent, there should be utilized about 0.3 to about 3.0 g./l. of hydrogen peroxide (approximately 0.02 to 0.2 equivalent) and from about 1 g./l. to about 2 g./l. of dichromate (approximately 0.03 to 0.055 equivalent). However, when an aqueous solution made up from chromic acid and calcium carbonate or when an aqueous solution made up from potassium dichromate and calcium acetate is used, then lower amounts of dichromate can be utilized and thicker coatings can be obtained, for example about 0.735 g./l. to about 0.95 g./l. of dichromate (approximately 0.02 to 0.03 equivalent).

The above described preferred composition can be utilized to good advantage to produce quality coatings the thickness of which can be controlled by the time a metallic surface is immersed therein.

---

[1] An authoritative discussion concerning latex resins may be found in Emulsion and Water Soluble Paints and Coatings by Charles R. Martens, published by Reinhold Publishing Corporation, 1964.

There follows a description of conditions under which a coating may be applied in the practice of this invention.

The time of immersion of a metallic surface in the coating composition of this invention may vary from as little as 30 seconds to as much as 10 minutes or even longer. However, it has been found that while coating weights increase with prolonged treating times, maximum coating weights seem to be realized within about 10 minutes time, so that longer exposure of the metal surfaces to the action of the coating compositions generally do not yield correspondingly heavier coating weights. This matter of coating weights is also dependent to some extent upon the type of coating-forming material employed, so that in any particular instance preliminary coating weight determinations may be run in order to ascertain the type of coatings which are likely to be obtained with a particular system. In the interest of economy, suffice it to say that it is preferred to operate utilizing coating cycles of from about 1 to about 3 minutes duration.

As was pointed out above, the coating weight, for a particular coating composition and type of metal surface being treated, tends to increase, up to a maximum, as the time of treatment is increased. Once the operating characteristics of a particular coating system have been ascertained, this fact can be exploited to provide a convenient, readily variable control parameter for securing the desired coating weight. If a light coating is desired, a short treating time can be employed, and when a heavy coating is desired, the treating time can be lengthened. This advantage is unavailable to those using prior treating methods, because the coating weight obtained under those prior methods is not, as a practical matter, a function of time.

This feature of the invention is illustrated by the following data. When a treating composition conforming to Example 1, below was used to coat steel panels under the treating conditions set out in detail in the discussion of Example 1, it was found that after two minutes of exposure the steel panels had a coating weighing 467 mgs./sq. ft. After four minutes of exposure, the coating weight obtained was 813 mgs./sq. ft., and after ten minutes exposure the coating weight increased to 1563 mgs./sq. ft. Further lengthening of the exposure time beyond ten minutes did not result in an increase in coating weight.

With respect to bath temperature, this is preferably operated anywhere from ambient temperature, that is from about 20° C., up to about 40° C. If the coating bath temperatures are permitted to rise much in excess of about 40° C. it has been found that coating weights begin to decrease, so that if heavier coatings are desired they will not be obtained by raising the temperature—other factors held constant. Nevertheless, coatings can be produced when the temperature of the composition is in excess of about 40° C. Obviously, temperatures which render the composition unstable should be avoided. Since the coatings obtained at ambient temperature are completely satisfactory, it is preferred to operate at this temperature so as to obviate the necessity of maintaining heated bath compositions, and thus obtain a reduction in coating costs. Of greater importance, however, is bath stability, which is at its maximum at room temperature. It has been noted that with respect to latices, these are more stable at room temperature.

Nevertheless, some advantages can be obtained by immersing the metallic surface in a heated coating composition. With all factors held constant except the temperature of the coating bath, it has been found that higher weight coatings can be obtained as the temperature of the composition is raised. The coating weight begins to fall off as the temperature exceeds a certain limit, which limit will vary depending on the type of coating-forming material utilized in formulating the coating composition.

It is preferred that relative motion be maintained between the coating composition and the metallic surface immersed therein. This may be accomplished, for example, by stirring the composition with a mixer or by moving the surface in the composition. By maintaining relative motion between the surface and the composition, heavier or thicker coatings can be obtained. By way of example, it is noted that in one experiment wherein a metallic surface was moved in the composition, there was obtained a coating that weighed almost ten times as much as a coating formed on a surface that was simply immersed in the composition with no relative motion between it and the composition being maintained.

Following treatment of metallic surfaces in the acidic aqueous coating composition of this invention, such surfaces may, if desired, be rinsed with water. A water rinse is not required.

It has been found that the corrosion resistance of resin-coated metallic surfaces can be improved by rinsing with water followed by rinsing with an aqueous rinse solution containing chromium, for example a dilute solution of chromic acid. There are many types of chromium-containing rinse compositions available and many of them are sold commercially. A preferred chromium rinse composition is one obtained when a concentrated aqueous solution of chromic acid is treated with formaldehyde to reduce a portion of the hexavalent chromium. This type of rinse composition, which is described in U.S. Pat. No. 3,063,877 to Schiffman, contains chromium in its hexavalent state and reduced chromium in aqueous solution. By way of example, such an aqueous rinse composition can comprise a total chromium concentration within the range of about 0.15 g./l. (expressed as $CrO_3$) to about 2 g./l., wherein from about 40–95% of the chromium is in its hexavalent state and the remainder of the chromium is in its reduced state. Other chromium rinses that can be utilized to good advantage are dilute solutions of chromic acid and solutions of sodium dichromate.

Whether or not a final water rinse is employed, the coating should be allowed to dry to evaporate water. In the case of a resinous coating, it should be allowed to fuse. This serves to render the coating continuous, thereby improving its resistance to corrosion and adherence to the underlying metal surfaces.

The conditions under which the drying operation is carried out depend somewhat upon the type of resin employed. Fusion characteristics of coatings formed from the various types of resins which can be utilized in practicing the invention are known and the drying conditions best utilized for a coating formed from a specific resin can be selected on the basis of previous experience. Some of the resins which are suitable for use in the invention do not require high temperatures for fusion, and for these resins air drying at ambient temperatures can be used. Drying can be accelerated by placing the coated surface in a heated environment. Most of the resinous coatings require heated drying stages, or baking, in order to fuse the resin and to insure that the desired corrosion resistance is obtained. In summary, while the drying operation can be performed at room temperature under some circumstances, it is generally preferred that it be done by oven drying or baking.

When a heated environment is used, the drying or fusion stage may be carried out at temperatures above 110° C., and preferably from 120 to 150° C. However, it is to be understood that whatever temperature is ultimately employed will depend, at least in part, on the particular resin utilized. For example, coatings formed from a polyethylene latex are satisfactorily fused within a temperature range of from about 110° C. to about 140° C.; tetrafluoroethylene coatings require appreciably higher temperatures. Since the resinous materials are organic, they will tend to degrade if extremely high drying temperatures are employed, and it is, of course, preferred that such temperatures be avoided. This factor presents no difficulty in the operation of the invention, since adequate drying or fusion without degradation is easily obtainable by operation within the temperature ranges set out above.

Drying temperature is also partially dependent upon the time cycles employed. Where relatively short drying cycles are used, i.e., from 30 seconds to two or three minutes, higher oven temperatures are needed. If the drying cycle is of appreciably longer duration, such as for example 10 to 15 minutes, then generally lower temperatures can be utilized. Suffice it to say, the choice of drying conditions will be dictated by considerations of the type of coating formed and drying cycles contemplated.

Although coating compositions prepared in accordance with the teachings of this invention are capable of producing films on metallic surfaces which have outstanding qualities with respect to both adhesion and corrosion resistance, it has also been discovered that still further enhancement of corrosion resistance qualities can be realized if a coalescing agent is incorporated into the coating composition.

Among the many coalescing agents which are available, it is preferred that ethylene glycol monobutyl ether, commonly known as butyl Cellosolve, be used. This particular agent demonstrates complete compatibility in various proportions in the coating composition of this invention, and imparts a high degree of adhesion with respect to bonding polymeric films. Examples of other coalescing agents that can be used are hexylene glycol, diethylene glycol monoethyl ether acetate, diethylene glycol monobutyl ether acetate and ethylene glycol monobutyl ether acetate.

With respect to the amount of coalescing agent used, it is preferred that from about 5 to about 30 grams (per liter of composition) of this agent be employed to realize the enhanced corrosion resistant and adhesion properties; nevertheless, higher or lower amounts can be utilized.

As an aid in assuring thorough wetting of the metallic surface during treatment, it is sometimes preferable to incorporate into the coating composition a small quantity of a wetting agent, such as up to about 0.15% by weight of the total composition, over and above that which may be present in the source of the coating-forming material, for example a latex. Use of wetting agents is preferred practice where the metallic surface to be treated is not thoroughly cleaned, since such agents permit wetting of the metallic substrate with removal of some or all of the contaminants present thereon. Preferably non-ionic or anionic type wetting agents are used; they provide satisfactory degrees of wetting when incorporated into the coating composition of this invention. Examples of wetting agents that can be utilized are alkyl phenoxy polyethoxy ethanol and sodium salts of alkylaryl polyether sulfonate.

If desired, the coating composition of the present invention may be formulated so as to provide decorative or aesthetic effects upon treated metallic surfaces. When applied to metallic surfaces, the colors of the coatings produced tend to vary depending on a number of factors, including for example, the conditions under which the coatings are dried or fused and the coating-forming material used. Variations in the color may be realized by adding to the composition commonly used water-dispersible pigments, such as for example, phthalocyanine blue, phthalocyanine green, carbon black or quinacridone red. Generally, these pigments provide excellent color variations with no sacrifice in coating quality. Any pigment that is compatible with the composition and does not make it unstable can be used.

The amount of pigment which may be employed will depend, as is well known in the art, upon the depth or degree of hue desired. It should be noted that when dispersible pigments are used, it is advantageous to employ a small quantity of a wetting agent, in accordance with the above discussion, to aid in dispersing the pigment and maintaining it in satisfactory dispersion.

It has been observed that metallic surfaces coated according to this invention have formed thereon an organic-inorganic coating, with the inorganic coating being sandwiched between the surface of the metal and the organic coating. The organic coating comprises the coating-forming material used in the coating composition. The nature of the inorganic coating has been difficult to characterize; however, when coating ferriferous surfaces, there has been found some evidence which would indicate that the inorganic coating is an oxide of the metal being coated, for example iron oxide. It can be said that this invention provides a process for applying simultaneously an inorganic coating and an organic coating to a metal substrate. Whatever the exact nature of the coatings, it is apparent that their corrosion resistant and adherent properties can be vastly superior to coatings produced by previous methods. The outstanding results that can be obtained from the utilization of the present invention will be apparent from a number of the examples set forth hereinafter.

In order to demonstrate the present invention there is presented below a series of examples showing the use of various types and grades of latex resins in aqueous solutions of hydrogen peroxide and fluoride ion in accordance with the teachings of this invention. The hydrogen peroxide was added in the form of a 30% aqueous solution of hydrogen peroxide and the hydrofluoric acid, the source of the fluoride ion, was added in the form of a 70% hydrofluoric acid solution. Also added to some of these examples are the various other additives which have been found to be suitable for use in this invention.

EXAMPLE 1

| Component: | Parts by wt., grams |
|---|---|
| Styrene-butadiene resin [1] | 50 |
| Hydrogen peroxide | 1.5 |
| Hydrofluoric acid | 1.5 |
| Water, to make 1 liter. | |

[1] Source—Pliolite 491 latex.

Steel panels, previously cleaned in a convenitional alkali metal silicate solution, were immersed in the bath of Example 1 for two minutes at 25° C. After removal from the bath these panels were divided into two sets, one set being dried in an oven at 140° C. for 10 minutes, the other set being subjected to water rinsing prior to oven drying as above. Coating thicknesses for both sets of panels averaged 0.55 mil., no differences being detectible between the rinsed and the unrinsed panels.

Salt spray corrosion tests (ASTM B–117–61) were run on representative panels from both sets treated in accordance with the above procedure. Completely satisfactory results were obtained after 16 hours exposure.

Adhesion tests were also run on panels from each set utilizing the following procedures which are commonly used in the testing of paints:

(1) Cross-hatch test

This test is an alternate method for testing paint adhesion. The painted surface is scribed with parallel lines approximately 1/16" apart and cut through to bare metal. Duplicate lines are scribed at right angles to make a cross-hatch pattern.

Scotch brand cellophane tape is pressed smoothly over the scribed area. After several seconds, the tape is pulled back rapidly so that the tape is turned back upon itself approximately 180° from its original pressed position.

Results are reported in the degree of failure noted: e.g. none, slight, moderate or heavy loss of paint.

(2) Impact test

The test panel is impacted by a falling 1/2" ball with a given force measured in inch-pounds, deforming the test specimen. After impact, the deformed surface is inspected for loose or cracked paint, usually on the reverse side of the impact, and rated descriptively. The degree of deformation, and accordingly the severity of any given force of impact, is dependent upon the thickness of the specimen. Normally, specimens heavier than 16 gage (0.0625″) are not used, for the maximum impact available—160 inch-pounds—causes little deformation to these heavy sections.

Results from these adhesion tests were excellent for both the water rinsed and the unrinsed panels.

EXAMPLE 2

Clean galvanized steel panels were immersed in an aqueous dispersion containing the following constituents, utilizing a coating temperature of 25° C. and a coating cycle of two minutes.

| Component: | Parts by wt., grams |
|---|---|
| Styrene-butadiene resin [1] | 50 |
| Hydrogen peroxide | 1.1 |
| Hydrofluoric acid | 1.26 |
| Water, to make 1 liter. | |

[1] Source—Pliolite 491 latex.

Following water rinsing and oven baking at 140° C. for ten minutes these coated panels were subjected to salt spray corrosion testing (ASTM B–117–61) and to Cross-hatch and Impact adhesion tests (as described above in Example 1). Results of these tests were completely acceptable.

EXAMPLE 3

In order to illustrate the improved adhesion results flowing from the process of the present invention, as compared with the use of a latex resin alone, clean steel panels were immersed in an aqueous dispersion containing the following constituents utilizing a coating temperature of 22° C. and a two minute immersion cycle.

| Component: | Parts by wt., grams |
|---|---|
| Polyethylene resin [1] | 5 |
| Hydrogen peroxide | 1.1 |
| Hydrofluoric acid | 1.26 |
| Water, to make 1 liter. | |

[1] Source—Poly-Em 40 latex.

Following treatment the steel panels were baked at 140° C. for 10 minutes.

Other clean steel panels were immersed in an aqueous dispersion containing 5 grams per liter of polyethylene resin, the source of which was also Poly-Em 40, but containing no hydrogen peroxide or hydrofluoric acid. These panels were also baked at 140° C. for 10 minutes.

Panels resulting from these two separate treatments were then subjected to the Cross-hatch and the Impact adhesion tests, as described above in Example 1. Results showed that the panels treated in the dispersions of this invention displayed excellent adhesion properties, showing no failure, while the panels treated in the aqueous dispersion of polyethylene without the use of hydrogen peroxide and hydrofluoric acid demonstrated complete failure in both adhesion tests.

EXAMPLE 4

In order to illustrate the enhanced corrosion resistance derived from the use of a coalescing agent, steel panels were immersed in an aqueous dispersion containing the following constituents and utilizing an immersion cycle of one minute at 30° C.

| Component: | Parts by wt., grams |
|---|---|
| Acrylic co-polymer resin [1] | 50 |
| Hydrogen peroxide | 1.2 |
| Hydrofluoric acid | 1.3 |
| Water, to make 1 liter. | |

[1] Source—Hycar 2600X92 latex.

Following the immersion cycle, the steel panels were immediately subjected to a drying cycle of 10 minutes at 140° C.

Butyl Cellosolve (ethylene glycol monobutyl ether), in the amount of 18 grams/liter, was added to the bath of Example 4, and steel panels were immersed for the same one minute cycles at 30° C. as used above. After treatment these panels were immediately dried at 140° C. for 10 minutes.

Salt spray corrosion tests (ASTM B–117–61) were run on both sets of panels. After 16 hours exposure incipient corrosion was observed on those panels treated in the bath which contained no butyl Cellosolve, whereas steel panels treated in the bath which did contain butyl Cellosolve were completely free of any traces of corrosion even after 114 hours testing.

Additional examples were run to illustrate various features of this invention. These are reported below in Table 1 along with the corrosion test results and the adhesion test results, all determined in accordance with the procedures set forth herein above in Example 1.

Reference in the Table to "ASTM B–117–61" signifies the salt spray corrosion test and the hours reported represent the duration of the test wherein no corrosion was observed on the treated metal panels. The references to "Impact" and "Cross-Hatch" represent adhesion tests as described above.

TABLE I

| | | Aqueous coating composition | | | | | Test results [1] | | |
|---|---|---|---|---|---|---|---|---|---|
| Ex. No. | Metal used | Latex used and resin therein | Resin (g./l.) | F- (g./l.) | $H_2O_2$ (g./l.) | Other additives | ASTM B-117-61 (hours) | Impact | Cross-hatch |
| 5 | Steel | Catalin A-1464, acrylic copolymer | 50 | 1.5 | 1.0 | 5 g./l. Aurasperse W 6014, Phthalo Green (Harshaw Chemical Co.) (as a pigment). | 16 | Excellent | No failure |
| 6 | do | Poly-Em 40, polyethylene | 550 | 0.4 | 3.0 | 20 g./l. butyl Cellosolve as coalescing agent. | 144 | do | Do. |
| 7 | Zinc | Pliolite 491, styrene-butadiene | 5 | 5 | 3.0 | do | 114 | do | Do. |
| 8 | Steel | Hycar 2600X-92, acrylic copolymer | 250 | 5 | 0.3 | 0.1 g./l. polyethoxylated alkyl phenol as wetting agent. | 18 | do | Do. |
| 9 | do | Catalin A-1464, acrylic copolymer | 25 | 3 | 1.5 | 5 g./l. butyl Cellosolve as coalescing agent. | 138 | do | Do. |
| 10 | Zinc | Geon 552, polyvinyl chloride | 12.5 | 1.5 | 2.0 | 25 g./l. butyl Cellosolve as coalescing agent. | 124 | do | Do. |
| 11 | do | Rhoplex HA-12, acrylic copolymer | 12.5 | 2.5 | 2.5 | 30 g./l. butyl Cellosolve as coalescing agent. | 22 | do | Do. |
| 12 | Steel | Teflon,[2] Disp. No. 30 | 50 | 2 | 0.75 | | 16 | do | Do. |

[1] All aqueous dispersions had pH values between 1.6 and 3.8. All coatings were applied at 25° C. using 5 minute immersion cycles. All coated panels were baked at 140° C., except the Teflon coated panel which was baked at temperatures in the range of about 315° C. to about 370° C., using 10 minute baking cycles.
[2] As supplied by Chemplast, Inc., Newark, N.J.

Set forth hereinafter are additional examples which show various facets of the invention. Unless otherwise indicated, appropriate amounts of HF (70%) and $H_2O_2$ (30%) were utilized in formulating the coating compositions of the examples to provide the stated amounts of the fluoride and hydrogen peroxide components. The source of the resin component is identified by the latex used. Appropriate amounts of the latex were used to provide the stated amount of resin.

Set forth in Table II below are examples which strikingly illustrate that the coating composition of this invention can be utilized to provide a metal surface with a coating, the weight of which is influenced by the time the surface is immersed in the composition. Two different coating compositions were used in gathering the results set forth in Table II. One composition contained about 12 g./l. of acrylic resin (Catalin A–1316 latex), 2 g./l. of fluoride, and 1.5 g./l. of hydrogen peroxide. The other composition contained the same amounts of fluoride and hydrogen peroxide, but instead of acrylic resin, it contained about 50 g./l. of polyethylene (Poly-Em 40 latex). The results set forth in Table II were obtained by immersing steel panels in the compositions for the various time periods set forth and determining the coating weights after the coatings were dry. The coating compositions were at ambient temperature when the steel panels were immersed therein.

TABLE II

| Ex. No.: | Time of immersion in minutes | Coating weight (mgs./sq. ft.) |
|---|---|---|
| | Acrylic | |
| 13 | 1 | 238.2 |
| 14 | 2 | 467.4 |
| 15 | 3 | 679.2 |
| 16 | 4 | 813.6 |
| 17 | 5 | 916.2 |
| 18 | 10 | 1,563.6 |
| | Polyethylene | |
| 19 | 1 | 579.0 |
| 20 | 3 | 1,306.2 |
| 21 | 5 | 1,596.0 |

As mentioned hereinabove, the temperature of the coating composition has an influence on the weight of coating produced on the metallic surface. This is illustrated in Table III below. The composition used in obtaining the results set forth in the table contained about 12 g./l. of acrylic resin (Catalin A–1316 latex), 2 g./l. of fluoride, and 1.5 g./l. of hydrogen peroxide. Steel panels were immersed in the composition for 3 minutes at the various temperatures set forth in the table. The weights of the coatings produced on the panels were determined after the coatings were dried.

TABLE III

| Ex. Number: | Temperature (° F.) of coating composition | Coating weight (mgs./sq. ft.) |
|---|---|---|
| 22 | 75 | 764.4 |
| 23 | 92.5 | 850.2 |
| 24 | 100 | 1070.4 |
| 25 | 110 | 1040.4 |
| 26 | 120 | 1022.4 |

It can be seen from the table that significant increases in the coating weights were obtained as the temperature was raised to about 100° F., but that as the temperature of the coating composition was raised above 100° F. (38° C.) the coating weights began to decrease for this particular composition.

There is set forth in Table IV below the weight of coatings formed on steel panels from aqueous coating compositions having different pH values. The composition contained approximately 50 g./l. of acrylic resin, the source of which was Catalin A–1316 latex, 2 g./l. of fluoride and 1.5 g./l. of hydrogen peroxide. The pH of this composition, which was 2.37, was varied and adjusted upwardly by adding 1.0 N NaOH to it. Between pH adjustments a panel was immersed in the composition. The weights of the coating formed on the panels from the composition are set forth in Examples 27, 28 and 30 of Table IV. Another coating composition, substantially the same in all respects as the one described above, was formulated, but its pH, which was 2.4, was varied and lowered by adding thereto concentrated HNO₃. Panels were immersed in the composition between pH adjustments. The coating weights formed on the panels are set forth in Examples 29, 31 and 32 of the table. The time of immersion for all panels was one minute.

TABLE IV

| Example Number: | pH of composition | Coating weight (mgs./sq. ft.) |
|---|---|---|
| 27 | 4.0 | 48.6 |
| 28 | 3.6 | 160.8 |
| 29 | 2.4 | 573.0 |
| 30 | 2.37 | 643.8 |
| 31 | 2.0 | 265.8 |
| 32 | 1.6 | 49.2 |

The next two examples are illustrative of the treatment of coated metallic surfaces, subsequent to their withdrawal from the coating bath, with chromium-containing rinse compositions.

EXAMPLE 33

A steel panel was immersed in a coating composition containing 50 g./l. of acrylic resin (Catalin A–1316 latex), 2 g./l. of fluoride, and 1.5 g./l. of hydrogen peroxide for 3 minutes. Upon withdrawal from the composition the coated panel was rinsed with an aqueous solution containing hexavalent chromium and reduced chromium. (The composition was prepared according to the method described in aforementioned Pat. No. 3,063,877.) The concentrations of the hexavalent and the reduced chromium were each about 0.5 g./l. (expressed as $CrO_3$). The coated panel was treated for 30 seconds with the rinse composition which had a temperature of 130° F. After the rinsing step was completed, the coated panel was baked to complete fusion of the coating.

EXAMPLE 34

A steel panel was treated in the same manner as set forth in Example 33 above, except that the rinse composition used in this example contained polyacrylic acids in addition to hexavalent chromium and reduced chromium. (This type of composition is disclosed in U.S. Pat. No. 3,185,596 to Schiffman.) The rinse composition contained 10 g./l. of $Cr^{+6}$ and a like amount of reduced chromium (expressed as $CrO_3$) and 4.1 g./l. of polyacrylic acids (source—Acrysol–A–1, a solution of water soluble polyacrylic acids).

After each of the panels of Examples 33 and 34 above were rinsed, they were subjected to a salt spray test (ASTM B–117–61). Another steel panel which was coated and baked in the same way as those of Examples 33 and 34, but which was not rinsed, was also subjected to the salt spray test. The results of the salt spray tests showed that the rinsed panels had much better corrosion resistance properties than the unrinsed panel, with the panel of Example 33 outperforming slightly the panel of Example 34.

The next two examples are illustrative of the use of a coating composition containing dichromate as the oxidizing agent and build-up of coating thickness as a function of time of immersion of a metallic object in the composition.

EXAMPLE 35

There was formulated an aqueous coating composition which contained about 50 g./l. of styrene-butadiene resin (Pliolite 491 latex), 2 g./l. of fluoride, and 1.1 g./l. of dichromate (the source of the dichromate was 2 mls. of an aqueous solution prepared from 1.02 gs. of chromic acid and 0.19 g. of $CaCO_3$). A steel panel was immersed in the coating composition for 5 minutes. Upon withdrawal of the coated panel from the composition it was rinsed with tapwater and then dried at 140° C. for 10 minutes. Subsequent to the drying step, it was determined that the thickness of the coating was 0.7 mil. The coated panel was subjected to a salt spray test (ASTM B-117-61). The result of the test was 168 hours.

EXAMPLE 36

The same coating composition and procedure set forth in Example 35 was utilized to coat a steel panel except that the panel was allowed to remain in the coating composition for 10 minutes instead of 5 minutes. The coating had a thickness of 1.5 mils and the result of the salt spray test was 360 hours.

From examples 35 and 36, it can be seen that the panel of Example 36, which was immersed for a period of time twice as long as that of Example 35, had a coating more than twice as thick as the panel of Example 35 and corrosion resistant properties more than twice as good.

Exemplary coating compositions showing the use of various types of resins in combination with dichromate and fluoride are set forth in Table V. Each composition contained about 50 g./l. of the resin identified in the table, 1.1 g./l. of dichromate (added as the previously described aqueous solution of chromic acid and calcium carbonate), and 2 g./l. of fluoride (added as 70% HF acid). Each of the compositions had a pH of 3.2 except the composition of Example 37 which had a pH of 3.4. Steel panels were immersed in the compositions and the thicknesses of the coatings obtained were measured. The coated panels were subjected to the ASTM B-117-61 salt spray corrosion test. The test results as well as the thicknesses of the coatings are set forth in the table. There is also set forth the latex which was utilized as the source of the resin.

TABLE V

| Ex. No. | Latex used and resin therein | Coating thickness (mils) | ASTM B-117-61 (hours) |
|---|---|---|---|
| 37 | Pliolite 491, styrene-butadiene | 0.6 | 242 |
| 38 | Acrylene 45, acrylic co-polymer | 0.5 | 190 |
| 39 | Catalin A-1464, acrylic co-polymer | 1.0 | 190 |
| 40 | Catalin A-1482, acrylic co-polymer | 0.3 | 88 |
| 41 | Chemigum 235, butadiene acrylonitrile | 0.7 | 232 |
| 42 | Geon 552, polyvinyl chloride | 1.0 | 232 |
| 43 | Hycar 2600X-91, acrylic co-polymer | 1.1 | 88 |
| 44 | Hycar 2600 X-92, acrylic co-polymer | 0.6 | 88 |
| 45 | Catalin A-1422, acrylic co-polymer | 0.2 | 24 |
| 46 | Rhoplex HA-12, acrylic co-polymer | 0.3 | 16 |
| 47 | Poly-Em 40, polyethylene | 0.6 | 16 |
| 48 | Pliovic 400, acrylic copolymer | <0.1 | 16 |
| 49 | Poly-Em 20, polyethylene | 1.0 | 16 |

Set forth in Table VI below are exemplary coating compositions showing some of the sources which can be used to provide the dichromate component of the composition of this invention, as well as the use of varying amounts of dichromate. Each composition contained about 50 g./l. of styrene-butadiene resin (Pliolite 491 latex), 2 g./l. of fluoride added as 70% hydrofluoric acid and dichromate as indicated in Table VI. It is noted that the sources of dichromate, which were added to the composition in solution form, are also given in the table, as well as the pH of certain of the compositions. It is noted also that the compositions of Examples 56 to 60 contained calcium acetate and that those of Examples 62–70 contained calcium carbonate. The amounts of these ingredients are set forth in the table. Steel panels were immersed in the compositions for 5 minute periods and the thicknesses of the coatings obtained were measured after the coated panels were rinsed with tap water and dried at 140° C. for 10 minutes. The coated panels were then subjected to the ASTM B-117-61 salt spray corrosion test. These test results, as well as the thickness of the coatings, are set forth in the table.

TABLE VI

| Example Number | Source of dichromate | Conc. of $Cr_2O_7$ in coating comp. (g./l.) | Ca salt (g./l.) | pH of comp. | Coating thickness (mil.) | ASTM B-117-61 (hours) |
|---|---|---|---|---|---|---|
| 50 | $K_2Cr_2O_7$ | 0.735 | | NR | 0.1 | 16 |
| 51 | Same as above | 1.102 | | 3.4 | 0.3 | 43 |
| 52 | do | 1.47 | | NR | 0.25 | 16 |
| 53 | do | 2.205 | | NR | 0.13 | 16 |
| 54 | do | 2.94 | | NR | 0.03 | 16 |
| 55 | $MgCr_2O_7$ | 1.08 | | 3.3 | 0.25 | 24 |
| 56 | $K_2Cr_2O_7$ and Ca acetate | 0.735 | 0.2 | 3.5 | 0.4 | 215 |
| 57 | do | 0.735 | 0.4 | 3.5 | 0.6 | 215 |
| 58 | do | 0.735 | 0.6 | 3.6 | 0.5 | 215 |
| 59 | do | 0.735 | 0.8 | 3.6 | 0.4 | 215 |
| 60 | do | 0.735 | 1.0 | 3.6 | 0.4 | 215 |
| 61 | Chromic acid | 1.5 | | 3.0 | 0.25 | NR |
| 62 | Chromic acid and Ca carbonate | 0.47 | 0.1 | 3.0 | 0.05 | 16 |
| 63 | do | 0.94 | 0.19 | 3.0 | 0.1 | 16 |
| 64 | do | 0.94 | 0.19 | 3.4 | 0.6 | 242 |
| 65 | do | 0.94 | 0.19 | 3.5 | 0.6 | 263 |
| 66 | do | 1.17 | 0.23 | 3.4 | 0.6 | 263 |
| 67 | do | 1.27 | 0.26 | 3.4 | 0.8 | 382 |
| 68 | do | 1.42 | 0.28 | 3.3 | 0.3 | 16 |
| 69 | do | 1.65 | 0.33 | 3.3 | 0.3 | 16 |
| 70 | do | 1.89 | 0.38 | 3.5 | 0.1 | 16 |

Note.—"NR" means not recorded.

Set forth in Table VII below are exemplary coating compositions showing some of the sources which can be used to provide the acid component of the composition of this invention. Each of the compositions of the examples contained 50 g./l. of styrene-butadiene resin (Pliolite 491 latex), 1.5 g./l. of $H_2O_2$ and the acid set forth in the table. The acid was added to the composition in amounts sufficient to impart to the composition the pH values stated in the table.

TABLE VII

| Example Number | Acid added to composition | pH of composition |
|---|---|---|
| 71 | Phosphoric | 2.6 |
| 72 | Hydrochloric | 2.45 |
| 73 | Sulfuric | 2.75 |
| 74 | Acetic | 2.88 |
| 75 | Lactic | 2.85 |
| 76 | Tartaric | 2.8 |

Steel panels were immersed in each of the compositions of Examples 71–76 and upon withdrawal of the panels from the compositions resinous coatings were formed thereon. It will be appreciated from the compositions set forth in the above table that a variety of types and kinds of acids can be utilized in the compositions of this invention.

The next example is illustrative of a composition containing a mixture of acids.

EXAMPLE 77

There was formulated 1 liter of aqueous composition containing 50 gs. of styrene-butadiene resin (Pliolite 491 latex), 5 mls. of 21% hydrofluoric acid (1 g. of F), 5 mls. of 75% phosphoric acid and 1.5 gs. of $H_2O_2$. This composition was utilized to provide a steel panel with an excellent resinous coating.

The next example shows the use of an aqueous coating composition comprising a solution of dissolved resin coating material to form a resinous coating on a metallic surface according to the invention.

EXAMPLE 78

To a breaker, there was added 100 mls. of an aqueous solution of polyacrylic acids (source—Acrysol A–3—25 wt. percent polyacrylic acids having a molecular weight less than 150,000), 5 mls. of 30% $H_2O_2$ (1.5 gs.) and sufficient water to make 1 liter of the composition. A steel panel immersed in the composition and withdrawn therefrom had formed thereon a polyacrylic resin coating.

With respect to the above example, it is noted that the source of the acid component for the coating composition described therein was the polyacrylic acid ingredient which was also the source of the resin-coated ingredient.

The next example shows the application to a metallic surface of a coating comprising two different resins by the use of this invention.

EXAMPLE 79

To 1 liter of the composition of Example 78, there was added 100 mls. of an acrylic latex (Catalin A–1316 latex—approximately 50 wt. percent resin solids) to provide 1100 mls. of a composition having dispersed therein particles of acrylic resin and approximately 25 gs. of polyacrylic acids dissolved in the composition. A steel panel immersed in the composition and withdrawn therefrom had formed thereon a resinous coating which was made up of the acrylic resin of the latex and the resin derived from the polyacrylic acids component.

Set forth in Table VIII below are examples referring to coating compositions which illustrate some of the oxidizing agents which can be utilized in the composition of this invention. Each of the compositions contained 2 g./l. of fluoride (added as hydrofluoric acid), 50 g./l. of the resin identified in the table and the oxidizing agent (and amounts thereof) set forth in the table.

TABLE VIII

| Ex. No. | Resin and latex used | Oxidizing agent | Conc. of oxidizing agent (g./l. of comp.) |
|---|---|---|---|
| 80 | Styrenebutadiene, Pliolite 491. | Ammonium persulfate | 10.3 |
| 81 | do | Sodium perborate | 6.9 |
| 82 | Acrylic, Catalin A–1316 | Potassium permanganate | 4.7 |
| 83 | do | Sodium nitrite | 6.2 |
| 84 | Acrylic co-polymer, Catalin A–1464. | Potassium nitrate | 4.5 |
| 85 | do | Sodium chlorate | 1.9 |
| 86 | do | Sodium bromate | 2.3 |

Steel panels were immersed in each of the compositions of the examples set forth in Table VIII. Upon withdrawal of the panels, it was found that each of the compositions was effective to impart to the panel a resinous coating. From these examples it will be appreciated that a variety of oxidizing agents can be utilized in the practice of this invention.

The next example is illustrative of the use of one ingredient which functions as an oxidizing agent and a source of acid for the compositions of this invention.

EXAMPLE 87

There was formulated 1 liter of aqueous composition containing 50 gs. of acrylic resin (Catalin A–1464 latex) and sufficient nitric acid to impart to the composition a pH of 2.5. This composition was utilized to form a resinous coating on a steel panel which was immersed in the composition.

The next example shows a non-resinous organic coating composition and its use to form a coating on a metallic surface immersed therein according to the invention.

EXAMPLE 88

1 liter of aqueous composition containing 50 grams of stearic acid, 2 grams of fluoride (added as hydrofluoric acid) and 1.5 grams of hydrogen peroxide was prepared. This composition also contained 20 mls. of an anionic surfactant and a few mls. of a nonionic surfactant. The anion surfactant was Tergitol Anionic P–28 sodium di-(2-ethylhexyl) phosphate. The nonionic surfactant was Triton N–100 (an ethoxylated nonyl phenol). The stearic acid, the coating-forming ingredient, was present in the composition in emulsified form. A steel panel was immersed in the composition for 5 minutes. Upon withdrawal of the panel it was found that there had formed thereon a coating of stearic acid, which coating could not be rinsed off with running tap water.

The present invention provides a number of important improvements in the art of coating metallic surfaces with organic resinous and non-resinous materials. By way of summary, it is noted that the invention in both its composition and method aspects can be utilized to coat metallic surfaces in a manner such that the thickness of the coating formed on the surface is a function of the time of immersion. Coatings of improved corrosion resistance and adhesion can be obtained. Coatings which are uniform and continuous without the presence of sags, pinholes and bare spots can be produced.

Subject matter disclosed herein is disclosed also in application Ser. No. 791,762, filed of even date herewith.

We claim:

1. A process for applying a coating to a metallic surface comprising: immersing the surface in an acidic aqueous coating composition comprising, in coating-forming proportions, water, hydrogen ion, an oxidizing agent which contains oxygen, and a water-dispersible, film-forming, polymeric resinous material dispersed in said composition, the pH of said composition being within the range of about 1.6 to about 3.8; depositing the resinous material on the surface while it is immersed in the composition to form thereon a resinous coating, maintaining the surface in the composition and depositing thereon additional resinous coating to thereby produce on the surface a resinous coating, the thickness of which increases during at least a portion of the time the surface is immersed in the composition; and withdrawing the resinous-coated surface from the composition after sufficient time has elapsed for the formation of the desired amount of coating on the surface; wherein said composition will produce said coating on said metallic surface in the absence of any electrical charge on said metallic surface other than that imparted thereto by said composition, and wherein said resinous coating is initially adherent and resists being removed from said surface when it is rinsed after it is withdrawn from said composition.

2. A process according to claim 1 wherein the oxidizing agent is present in an amount such that it has an oxidizing equivalent of at least 0.01 oxidizing equivalent per liter of composition.

3. A process according to claim 1 wherein the oxidizing agent is present in an amount such that it has an oxidizing equivalent within the range of about 0.01 to about 0.2 oxidizing equivalent per liter of composition.

4. A process according to claim 1 wherein the source of said resinous material is a latex.

5. A process according to claim 1 wherein the oxidizing agent is selected from the group consisting of hydrogen peroxide and dichromate.

6. A process according to claim 1 wherein the oxidizing agent is hydrogen peroxide.

7. A process according to claim 1 wherein said resinous material is selected from the group consisting of styrenebutadiene, acrylonitrile-butadiene, polyethylene, acrylic, tetrafluoroethylene, and polyvinyl chloride resins.

8. A process according to claim 1 wherein the composition contains a coalescing agent.

9. A process according to claim 1 wherein the composition contains a pigment.

10. A process according to claim 1 wherein the coated surface is rinsed after it is withdrawn from the composition with an aqueous rinse solution containing chromium.

11. A process according to claim 1 including heating the composition to a temperature of no greater than about 40° C.

12. A process according to claim 1 including providing relative motion between the coating composition and the surface immersed therein.

13. A process according to claim 1 including applying said coating to said metallic surface in the absence of any electrical charge on said metallic surface other than that imparted thereto by said composition and withdrawing the resinous coated surface from the composition within about 30 seconds to about 10 minutes after the surface was immersed in the composition.

14. A process according to claim 1 wherein the coating composition contains fluoride ion.

15. A process according to claim 14 wherein fluoride ion is added to the composition as hydrofluoric acid.

16. A process according to claim 14 wherein the composition contains phosphoric acid.

17. A process for applying a coating to a metallic surface selected from the group consisting of ferriferous and zinciferous surfaces comprising: immersing the surface in an acidic aqueous coating composition having a pH within the range of about 1.6 to about 3.8 and comprising in coating-forming proportions, water, hydrogen ion, an oxidizing agent selected from the group consisting of hydrogen peroxide and dichromate and a water-dispersible film-forming polymeric resinous material dispersed in said composition; depositing the resinous material on the surface while it is immersed in the composition to form thereon a resinous coating; maintaining the surface in the composition and depositing additional resinous coating thereon thereby forming on the surface a resinous coating, the amount of which increases during at least a portion of the time the surface is immersed in the composition; and withdrawing the resinous coated surface from the composition after sufficient time has elapsed for the formation of the desired amount of coating on the surface; wherein said composition will produce said coating on said metallic surface in the absence of any electrical charge on said metallic surface other than that imparted thereto by said composition, and wherein said resinous coating is initially adherent and resists being removed from said surface when it is rinsed after it is withdrawn from said composition.

18. A process according to claim 17 wherein said coating is formed on said metallic surface in the absence of any electrical charge on said metallic surface other than that imparted thereto by said composition and wherein the resinous coated surface is withdrawn from the composition within about 30 seconds to about 10 minutes after it was immersed therein.

19. A process according to claim 17 wherein the composition contains phosphoric acid.

20. A process according to claim 17 wherein the source of said resinous material is a latex.

21. A process according to claim 20 including fusing the coated surface at elevated temperature after it is withdrawn from the composition.

22. A process according to claim 17 wherein said resinous material is selected from the group consisting of styrene-butadiene, acrylonitrile-butadiene, polyethylene, acrylic, tetrafluoroethylene, and polyvinyl chloride resins.

23. A process according to claim 22 wherein the metallic surface is a ferriferous surface.

24. A process according to claim 17 wherein the oxidizing agent is present in an amount such that it has an oxidizing equivalent of at least 0.01 oxidizing equivalent per liter of composition.

25. A process according to claim 24 wherein the oxidizing equivalent is no greater than about 0.2.

26. A process for applying a coating to a metallic surface selected from the group consisting of ferriferous and zinciferous surfaces comprising: immersing the surface in an acidic aqueous composition comprising, in coating-forming proportions:
(a) about 5 grams per liter to about 550 grams per liter of a water-dispersible, film forming, polymeric resinous material dispersed in the composition;
(b) an oxidizing agent selected from the group consisting of hydrogen peroxide and dichromate in an amount sufficient to provide at least about 0.01 oxidizing equivalent per liter of composition; and
(c) hydrogen ion in an amount sufficient to impart a pH to the composition of about 1.6 to about 3.8;
depositing the resinous material on the surface while it it immersed in the composition to form thereon a resinous coating; maintaining the surface in the composition and depositing additional resinous coating thereon thereby forming on the surface a resinous coating, the amount of which increases during at least a portion of the time the surface is immersed in the composition; and withdrawing the resinous-coated surface from the composition after sufficient time has elapsed for the formation of the desired amount of coating on the surface; wherein said composition will produce said coating on said metallic surface in the absence of any electrical charge on said metallic surface other than that imparted thereto by said composition, and wherein said resinous coating is initially adherent and resists being removed from said surface when it is rinsed after it is withdrawn from said composition.

27. A process according to claim 26 wherein the composition contains phosphoric acid.

28. A process according to claim 26 wherein the composition contains a coalescing agent.

29. A process according to claim 26 wherein the composition contains a pigment.

30. A process according to claim 26 wherein the coated surface is rinsed after it is withdrawn from the composition with an aqueous rinse solution containing chromium.

31. A process according to claim 26 including heating the composition to a temperature of no greater than about 40° C.

32. A process according to claim 26 including fusing the coated surface at elevated temperature after it is withdrawn from the composition.

33. A process according to claim 26 wherein the metallic surface is ferriferous.

34. A process according to claim 26 wherein the resinous material is selected from the group consisting of styrene-butadiene, acrylonitrile-butadiene, polyethylene, acrylic, tetrafluoroethylene, and polyvinyl chloride resins.

35. A process according to claim 34 wherein the source of the resin is a latex thereof.

36. A process for applying a coating to a metallic surface comprising:
(a) immersing a metallic surface in an aqueous acidic organic coating composition comprising, in coating-forming proportions, water, hydrogen ion, an oxidizing agent which contains oxygen, and an organic coating material selected from the group consisting of water-soluble, water-dispersible and water-emulsifiable film-forming polymeric resinous materials;
(b) depositing said resinous material on said surface to form thereon a resinous coating while said surface is immersed in said composition;
(c) maintaining said surface in said composition and depositing thereon additional resinous material to thereby produce a resinous coating, the thickness of which increases during at least a portion of the time said surface is immersed in said composition; and (d) withdrawing the resinous-coated surface from said composition after the desired amount of resinous coating has been deposited on said surface; wherein said composition will produce said coating on said metallic surface in the absence of any electrical charge on said metallic surface other than that imparted thereto by said composition, and wherein said composition is sufficiently acidic to effect an increase in the amount of resinous coating deposited within at least about 10 minutes from the time said metallic surface is immersed in said composition; and wherein said resinous coating is initially adherent and resists being moved from said surface when it is rinsed after it is withdrawn from said composition.

37. A process according to claim 36 wherein said oxidizing agent is selected from the group consisting of hydrogen peroxide and dichromate.

38. A process according to claim 36 wherein said compoistion contains fluoride ions.

39. A process according to claim 36 wherein the pH of said composition is within the range of about 1.6 to about 3.8.

References Cited

UNITED STATES PATENTS

| | | | |
|---|---|---|---|
| 2,681,324 | 6/1954 | Hochberg | 260—29.6 |
| 2,902,390 | 9/1959 | Bell | 148—6.2X |
| 3,021,228 | 2/1962 | Gibson et al. | 117—134X |
| 3,036,934 | 5/1962 | Horton et al. | 148—6.2X |
| 3,053,692 | 9/1962 | Pocock | 148—6.2X |
| 3,063,877 | 11/1962 | Schiffman | 148—6.16 |
| 3,132,055 | 5/1964 | Tanaka | 148—6.2X |
| 3,185,596 | 5/1965 | Schiffman | 148—6.2X |
| 3,339,271 | 9/1967 | Durfee et al. | 117—113X |
| 3,396,042 | 8/1968 | Duva | 117—113X |
| 3,397,077 | 8/1968 | Boller et al. | 148—6.14X |

References Cited

FOREIGN PATENTS

| | | | |
|---|---|---|---|
| 616,654 | 3/1961 | Canada | 198—6.2 |

WILLIAM D. MARTIN, Primary Examiner

H. J. GWINNELL, Assistant Examiner

U.S. Cl. X.R.

117—113, 132

UNITED STATES PATENT OFFICE
CERTIFICATE OF CORRECTION

Patent No. 3,585,084            Dated June 15, 1971

Inventor(s) Lester Steinbrecher and Wilbur S. Hall

It is certified that error appears in the above-identified patent and that said Letters Patent are hereby corrected as shown below:

IN THE SPECIFICATION

Column 1, line 58, read "to" before --provide--.

Column 1, line 59, "an" should read --on a--.

Column 4, line 55, "electricapl" should read --electrical--.

Column 12, Example 1, the amount of Hydrofluoric acid should read --2.1--.

Column 19, line 7, "breaker" should read --beaker--.

Signed and sealed this 30th day of November 1971.

(SEAL)
Attest:

EDWARD M. FLETCHER, JR.          ROBERT GOTTSCHALK
Attesting Officer                 Acting Commissioner of Patents